2,974,112

POLYESTER CONTAINING ESTER OF LEVULINIC ACID AND PENTAERYTHRITOL AND DRYING OIL ACIDS WITH OXIDATION OF POLYESTER PRODUCT

Alan K. Forsythe, Manor Township, Lancaster County, and John A. Parker, Lancaster Township, Lancaster County, Pa., assignors to Armstrong Cork Company, Lancaster, Pa., a corporation of Pennsylvania No Drawing. Filed May 1, 1959, Ser. No. 810,229

12 Claims. (Cl. 260—22)

This invention relates generally to resilient flooring and more particularly to a binder system suitable for use in resilient flooring. Still more particularly the invention relates to a carefully tailored and oxidized mixed polyester system having outstanding properties as a binder for resilient floorings.

Long-wearing resilient floorings these days are generally of two types. The first type is the well-known linoleum, the binder system of which is prepared by the oxidation of siccative fatty acids, esters, or both, in the presence of rosin. The second type of long-wearing resilient flooring is the so-called plastic flooring, the wearing surface of which comprises a thermoplastic synthetic resin such as polyvinyl chloride, vinyl chloride-vinyl acetate copolymers, or other vinyl compositions. Each of the two types of resilient floorings possesses its own desirable properties and characteristics, and each has its own shortcomings.

There has not yet been developed a resilient flooring which possesses properties intermediate between those of linoleum and the so-called plastic flooring.

It is the primary object of the present invention to supply such an intermediate flooring. It is a further object of the present invention to supply a resilient flooring which possesses the alkali resistance not possessed by linoleum. It is still another object to supply a flooring in light colors which will not exhibit the traffic staining phenomenon exhibited by plastic floorings. It is a further object of the present invention to present a flexible resilient flooring in which light pastels and white pigmenting can be used without affecting alkali resistance, wear resistance, and other stringent properties requisite for a usable floor covering.

These objects have been accomplished in a surprisingly effective manner. The invention contemplates reacting isophthalic acid and certain glycols to form a polyester having an acid number in the range of 10–40. This polyester is admixed either with the monoester of levulinic acid and pentaerythritol, or with a mixture of levulinic acid and pentaerythritol containing a 0–0.6 molal excess of pentaerythritol. The resulting mixture will contain 40–60% by weight of the polyester, and accordingly, 60–40% by weight of the monoester or the mixture of levulinic acid and pentaerythritol. To the resulting mixture is added a drying oil acid. This reaction mixture is heated to produce a mixed polyester having an acid number in the range of 5–25. The resulting mixed polyester is then oxidized with the oxygen in air, or with oxygen itself, at a temperature in the range of 160°–220° F. to produce the desired plastic binder system.

The first component in the process of the present invention is the polyester prepared by reacting a glycol and isophthalic acid. The glycol may be 1,3-butanediol, neopentyl glycol, diethylene glycol, or ethylene glycol. The glycol must be reacted with isophthalic acid. The ratio of amounts of glycol and isophthalic acid is such to produce a polyester having an acid number in the range of 10–40 and more preferably in the range of 20–30. The polyester is prepared by known processes. The glycol and the acid are admixed and maintained at temperatures in the range of about 300°–450° F. until the requisite acid number is reached. Longer times will be required at lower temperatures, about 25 hours being required at a temperature of about 400° F. In accordance with the usual polyester techniques it is preferred to maintain an inert gas flow, such as carbon dioxide, through the mixture while heat is being applied. The gas flow aids in sweeping water of condensation out of the mixture and thus furthers the reaction. At the end of the reaction the resulting polyester will be found to be a liquid at a temperature of about 400° F., and a solid at room temperature. The liquid may be utilized immediately as such in the next step of the process. Alternatively the liquid may be poured into pans, cooled, broken up, and stored until needed subsequently.

The next step of the procedure involves the reaction of the glycol isophthalate with either the monoester of levulinic acid and pentaerythritol, or the ingredients for making the monoester. The monoester is readily prepared by admixing the pentaerythritol and the levulinic acid and heating the mixture with stirring, generally in the temperature range of 300°–400° F. to a final acid number in the range of 15–35. This acid number is produced most readily with a slight molal excess of pentaerythritol; this excess will run from 0% to about 0.6%. If the levulinic acid and pentaerythritol are to be used as such instead of in the form of a monoester, the same relative amounts of levulinic acid and pentaerythritol should be used as would be required if the monoester were to be formed. The description henceforth will proceed as if the monoester were used.

The relative amounts of the polyester and the monoester, if prepared as described above, should be such that the mixture of the two contains 40–60% by weight of the polyester, and accordingly, 60–40% by weight of the monoester.

The final ingredient to be added to the mixture of polyester and monoester is the drying oil acid. Such acids should be olefinically unsaturated as in the case of linoleic acid, linolenic acid, oleic acid, and the like. Most preferably, these drying oil acids will be those fatty acids found in the drying and semi-drying oils. The preferred embodiment constitutes the tall oil fatty acids. These fatty acids are obtained from crude tall oil by separatory processes which produce a fraction highly concentrated in olefinically unsaturated, 18-carbon fatty acids. Small amounts of rosin generally accompany these enriched fatty acid fractions.

The amount of drying oil acids to be added to the mixture of polyester and monoester will be that amount needed to produce in the final mixed polyester an acid number in the range of 5–25. This amount is most conveniently expressed on a weight basis, however, and the amount of drying oil acids in the mixture to be subsequently oxidized is preferably in the range of 50–75% by weight drying oil acids based on the total weight of the polyester-monoester-drying oil acid mixture.

Heat is supplied to this mixture to cause reaction. Preferably the temperature will be maintained in the range of 300°–400° F., with longer times being required at lower temperatures. A temperature of about 350° F. will require about 20 hours to produce an acid number of 15. In accordance with the usual techniques it is preferred that an inert gas be bubbled through the mixture during heating in order to sweep out of the reaction mixture the water of condensation that forms.

The resulting product is now ready for the final oxidative step. It is one of the advantages of the present process that the final mixed polyster may be treated precisely as if it were the usual siccative oil-rosin mixture normally fed to the standard oxidizers in the linoleum industry. Thus the oxidation step to be carried out on the mixed polyester is exactly that oxidation step normally carried out on the siccative oil-rosin mixture. The only distinction is that the mixed polyester of the present invention requires a shorter period of time in the oxidizer than does the siccative oil-rosin mixture. Oxidation temperature, in accordance with the known process, is in the range of 135°–220° F., and preferably about 180° F. Oxygen, preferably in the form of air, is passed into the oxidizer maintained at the above-described temperatures while vigorous agitation is maintained on the reaction mixture. Oxygen as such may certainly be used, as may oxygen-enriched air, but the costs of these latter two do not generally justify their use, particularly when air is so effective. The end point of the oxidation step is determined in known manner and is best identified by the fact that the cooled oxidized material is in the form of a stiff, flexible gel. The usual driers such as lead-manganese naphthenates, lead-manganese tallates, or lead-manganese octoates will be used to facilitate oxidation.

In accordance with usual practice the oxidized binder system is dumped out of the oxidizer into a cart, usually on a layer of wood flour, or limestone, to prevent sticking. Here the mass cools until needed.

This oxidized mixed polyester binder may then be formulated into a final composition as if it were linoleum cement. It may be admixed with fillers and pigments in the usual mixers, deposited in sheet or particle form on any of the usual backings of burlap, cellulosic felt, and asbestos felt, and calendered or otherwise hot pressed into the backing to form sheet goods ready to be subjected to the final curing operation.

Although final cure of the polyester compositions of the present invention may be carried out by mere stoving at elevated temperatures in the range of 180°–240° F., the time required is appreciable. Accordingly, it is preferred that a curing accelerator be incorporated into the polyester cement at the time when fillers and binders are admixed therewith. The preferred accelerator is that set forth in application Serial No. 593,336, filed June 25, 1956, now U.S. Patent No. 2,912,395. As defined in that application the preferred accelerators may be defined as those having the formula

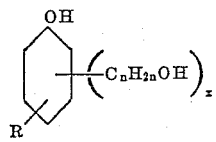

wherein $n$ is an integer from 1 to 2 inclusive, $x$ is an integer from 2 to 4 inclusive, and R is selected from the group consisting $C_yH_{2y+1}$— and

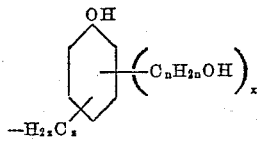

wherein $y$ is an integer from 1 to 30 inclusive, preferably 1 to 8 inclusive, $z$ is an integer from 1 to 5 inclusive, and $n$ and $x$ have the meanings assigned above. Preferably R and $C_zH_{2z}$— will be in the position para to the phenolic OH group.

The preferred monomeric accelerator as defined in the above-described patent application is the compound 2,2-bis-(3,5-dimethylol, 4-hydroxy phenyl)-propane. This preferred compound is prepared by the low temperature (less than 40° C.) reaction of at least 4 moles of formaldehyde with 1 mole of the bis phenol 2,2-bis-(4-hydroxy phenyl)-propane under alkaline conditions, followed by acidification and washing to produce the tetramethylol bis phenol product.

These preferred accelerators are used in an amount of 1–15% by weight based on the weight of the mixed polyester. Amounts of the accelerator less than 1% by weight are too small to produce any significant effect, while amounts larger than 15% by weight unduly stiffen the resulting product. The mechanism of the reaction between the accelerator and the mixed polyester is not understood. Apparently, however, the accelerator participates in some manner in curing or cross-linking reactions which proceed at the elevated temperatures encountered under stoving conditions.

It is one of the features of the mixed polyester cement of the present invention that a tough, strong, alkali-resistant, unusually light-colored flooring product can be made therefrom. It is postulated that the key to the success of the mixed polyester lies in the carbonyl group present from the levulinic acid. Work done to prepare mixed polyester cements identical with those described above save that the carbonyl group was absent did not produce a flooring with suitable properties.

The following examples show several embodiments of the present invention. All parts are by weight unless otherwise stated.

Example 1

Into a reaction vessel equipped with a thermometer, stirrer, gas inlet tube, and take-off condenser were placed 714 parts pentaerythritol and 486 parts levulinic acid. The mixture was heated with stirring at 175° C. under a carbon dioxide gas flow of 0.4 liters per minute to a final acid number of about 23.

Into a separate reaction vessel similar to the above-described reaction vessel are placed 79 parts 1,3-butanediol and 121 parts isophthalic acid. A temperature of 380° F. was maintained for 15 hours while carbon dioxide gas was bubbled through the mixture. Reaction was stopped by cooling when the acid number reached 25 and the hydroxyl number reached 48.5.

Into a similar type of reaction vessel described above were placed 229 parts of the above-described monoester of levulinic acid and pentaerythritol, and 256 parts of the 1,3-butylene isophthalate. The mixture was heated at 200° C. under carbon dioxide for one hour at which time there was added 1,000 parts of tall oil fatty acids containing 1% by weight rosin acids. The resulting mixture was heated at 175° C. with carbon dioxide bubbled therethrough at the rate of one liter per minute until an acid number of 15 was reached. The time required was 20 hours.

The resulting yellow liquid was oxidized at 180° F. by bubbling air therethrough with vigorous stirring for 11–12 hours. On cooling, a stiff, flexible gel resulted.

Utilizing the polyester gel binder described above, a flooring composition was prepared with the following ingredients:

| Ingredients | Parts |
|---|---|
| Polyester gel binder | 204 |
| Finely-divided calcium carbonate | 51 |
| Asbestos | 180 |
| Finely-divided silicon dioxide | 60 |
| Kaolin clay | 36 |
| 2,2-bis-(3,5-dimethylol, 4-hydroxyl phenyl)-propane | 36 |

The binder and fillers were mixed at 250–270° F. on a two-roll mill and finally sheeted off to 0.070 inch at 170°–190° F. The sheets were given a brief cure for five hours at 150° F. and then cured to an indentation of 20% in 88 hours at 200° F. A tough, resilient flooring of excellent white color was obtained.

Example 2

Into a 100-gallon kettle were charged:

237 pounds 1,3-butanediol
363 pounds isophthalic acid.

The mixture was brought to 392° F. and maintained at that temperature for 16 hours followed by an increase of temperature to 410° F. for nine hours at which time an acid number of 25 was reached. A gas flow of carbon dioxide of 3–5 liters per minute was maintained throughout. The resulting polyester was poured into drums and allowed to cool and solidify.

Into a 100-gallon varnish kettle were charged:

243 pounds levulinic acid
357 pounds monopentaerythritol.

The mixture was heated to 347° F. with a gas flow of 3–5 liters of carbon dioxide per minute and held at that temperature until an acid number of 23 was reached. The time required was three hours.

Into a 400-gallon kettle were charged the following in liquid form:

403 pounds 1,3-butylene isophthalate
424 pounds pentaerythritol levulinate
1573 pounds tall oil fatty acids.

The temperature was raised to 347° F., with a carbon dioxide flow of 3–5 liters per minute, and maintained at that temperature for 3½ hours. The gas flow was increased to 8 liters per minute, and the mixture was held under these conditions until an acid number of 15 was achieved.

The batch was cooled and 1500 pounds of the reaction product was transferred to a linoleum cement oxidizer. To the mixed polyester was added 38 pounds of lead-manganese naphthenate drier. Oxidation was conducted at 180° F. to an end point which was determined by the visco-elastic behavior of the resultant hot gel.

The oxidized mixed polyester was dumped into a cart to cool.

When the above-described plastic binder system was fabricated into a resilient flooring with inorganic fillers, a strong, tough, flexible, alkali-resistant resilient flooring having excellent color characteristics resulted.

*Example 3*

Into a reaction vessel equipped with a thermometer, stirrer, gas inlet tube and take-off condenser were placed 1848 parts neopentyl glycol and 1992 parts isophthalic acid. The mixture was heated with stirring at 400° F. under a $CO_2$ gas flow to a final acid number of approximately 3.3 and a hydroxyl number of 165.

Into a separate reaction vessel are placed 714 parts pentaerythritol and 486 parts levulinic acid. A temperature of 175° F. was maintained until the acid number reached 23.

Into a similar type of reaction vessel were placed 269.4 parts of the monoester of pentaerythritol and levulinic acid and 256 parts of the neopentyl isophthalate. The mixture was heated at 200° C. under $CO_2$ for one hour at which time there was added 1000 parts of tall oil fatty acids containing 1% by weight rosin acids. The resulting mixture was heated at 175° C. with $CO_2$ bubbled through at 1 liter per minute until an acid number of 15 was reached. The time required was 19 hours. Air oxidation at 180° F. produced an excellent cement.

*Example 4*

Into a reaction vessel equipped as previously described are placed 1602 parts neopentyl glycol and 2324 parts isophthalic acid. A temperature of 395° F. was maintained for 26 hours while $CO_2$ was bubbled through the mixture. The reaction was stopped by cooling when the acid and hydroxyl numbers reached 26 and 43 respectively.

Into a similar type of reaction vessel were placed 289.4 parts of the monoester of levulinic acid and pentaerythritol and 305 parts neopentyl isophthalate. The mixture was heated at 200° C. under $CO_2$ for one hour at which time there was added 1000 parts of tall oil fatty acids containing 1% by weight rosin acids. The resulting mixture was heated at 175° C. with $CO_2$ bubbled through until an acid number of 15 was reached. The time required was 14 hours. This polyester system became a thick yellow oil upon standing. Air oxidation at 200° F. produced a tough, strong, light-colored flooring binder.

We claim:

1. The method of making a plastic binder system for resilient flooring comprising reacting isophthalic acid and a glycol selected from the group consisting of 1,3-butylene glycol, neopentyl glycol, ethylene glycol, and diethylene glycol, to form a polyester having an acid number in the range of 10–40, admixing with said polyester a material selected from the group consisting of the monoester of levulinic acid and pentaerythritol, and a mixture of levulinic acid and pentaerythritol containing a 0–0.6 molal excess of pentaerythritol, the resulting mixture containing about 40–60% by weight of said polyester, adding to said resulting mixture a drying oil acid, heating the drying oil acid-containing mixture to produce a mixed polyester having an acid number in the range of 5–25, and oxidizing said mixed polyester with oxygen at a temperature in the range of about 160–220° F. to produce said plastic binder system.

2. The method according to claim 1 wherein said glycol comprises 1,3-butanediol.

3. The method according to claim 1 wherein said polyester has an acid number of about 25.

4. The method according to claim 1 wherein said material comprises the monoester of levulinic acid and pentaerythritol.

5. The method according to claim 1 wherein said drying oil acid comprises tall oil fatty acids.

6. The method according to claim 1 wherein said mixed polyester has an acid number of about 15.

7. The method according to claim 1 wherein said oxidizing step is conducted at a temperature of about 180° F.

8. A plastic binder system for resilient flooring prepared by reacting isophthalic acid and a glycol selected from the group consisting of 1,3-butylene glycol, neopentyl glycol, ethylene glycol, and diethylene glycol, to form a polyester having an acid number in the range of 10–40, admixing with said polyester a material selected from the group consisting of the monoester of levulinic acid and pentaerythritol, and a mixture of levulinic acid and pentaerythritol containing a 0–0.6 molal excess of pentaerythritol, the resulting mixture containing about 40–60% by weight of said polyester, adding to said resulting mixture a drying oil acid, heating the drying oil acid-containing mixture to produce a mixed polyester having an acid number in the range of 5–25, and oxidizing said mixed polyester with oxygen at a temperature in the range of about 160°–220° F. to produce said plastic binder system.

9. The product according to claim 8 wherein said glycol is 1,3-butylene glycol.

10. The product according to claim 8 wherein said material comprises said monoester.

11. The product according to claim 8 wherein said drying oil acid comprises tall oil fatty acids.

12. The product according to claim 8 wherein said oxidizing step is conducted at a temperature of 180° F.

References Cited in the file of this patent

UNITED STATES PATENTS

| 2,895,932 | Schlatter et al. | July 21, 1959 |
| 2,907,736 | Greenlee | Oct. 6, 1959 |